United States Patent [19]

Voigt et al.

[11] 4,092,709
[45] May 30, 1978

[54] MULTIPLE OUTPUT SELF OSCILLATING CONVERTER REGULATOR POWER SUPPLY

[75] Inventors: William C. Voigt; William F. Jergens, both of Houston, Tex.

[73] Assignee: Texas Instruments Incorporated, Dallas, Tex.

[21] Appl. No.: 726,375

[22] Filed: Sep. 24, 1976

[51] Int. Cl.$^2$ .................................................. H02M 3/315
[52] U.S. Cl. ......................................... 363/18; 323/17; 323/22 T; 363/89; 363/91
[58] Field of Search ............. 321/2, 18; 323/17, 22 T, 323/DIG. 1; 363/89, 90, 91, 18

[56] References Cited
U.S. PATENT DOCUMENTS

| | | | |
|---|---|---|---|
| 3,737,756 | 6/1973 | Hasley et al. | 321/2 |
| 3,816,809 | 6/1974 | Kuster | 323/DIG. 1 |
| 3,889,173 | 6/1975 | Klusmann | 323/17 |
| 3,974,439 | 8/1976 | Holland | 321/2 |
| 3,975,672 | 8/1976 | Lochocki | 323/17 |

*Primary Examiner*—Gerald Goldberg
*Attorney, Agent, or Firm*—Rene' E. Grossman; James T. Comfort; Thomas G. Devine

[57] ABSTRACT

A multiple output switching regulator power supply operates as a self-oscillating circuit with a light weight ferrite core transformer and a sense winding used exclusively for voltage regulation purposes. A power transistor switch is employed to selectively connect the transformer primary across a DC source of power to provide energy storage when the switch is closed and to provide energy transfer when the switch is open, by way of transformer flyback. The power transistor switch is controlled by a feedback circuit which includes a current sink connected to selectively divert current away from the base of the power transistor switch and a timing circuit for controlling the operation of the current sink. A capacitor, connected across the sense winding is monitored by a high gain voltage comparison circuit which activates the timing circuit in dependence on the voltage variation on the capacitor.

11 Claims, 2 Drawing Figures

MULTIPLE OUTPUT SELF OSCILLATING CONVERTER REGULATOR POWER SUPPLY

BACKGROUND OF THE INVENTION

1. Field of the Invention

This invention relates to power supplies for connection to readily available power sources. More specifically, it pertains to a switching regulator power supply which utilizes a ferrite core transformer.

2. Description of the Prior Art

The typical switching regulator power supply incorporates a transformer wound on a ferrite core wherein an energy storage period is used to store energy in the transformer primary and an energy transfer period is used to transfer energy from the primary to the secondary of the transformer when the primary circuit is opened. The basic prior art switching regulator power supply monitors electrical parameters in the primary circuit, having an AC coupling only through the transformer to the secondary circuit. Often, a small 60 hertz transformer must be used to assure that the power supply will work upon application of line voltage.

One type of switching regulator power supply uses a constant frequency clock and varies the amount of energy transferred by extending or shortening the energy storage cycle as described in copending patent application Ser. No. 502,703, now U.S. Pat. No. 4,101,663, "Switching Regulator Power Supply" and assigned to the assignee of this invention.

The second basic type of switching regulator power supply is one which employs a blocking oscillator and actually changes the frequency of oscillation to accomplish the desired energy transfer, as shown in U.S. Pat. No. 3,889,173 entitled "Switching Regulator Power Supply" assigned to the assignee of this invention.

The present invention involves monitoring electrical parameters in a sensing circuit providing simplicity of design and incorporating a high gain regulating circuit for accomplishing excellent output voltage regulation.

It is therefore an object of the present invention to provide a simple, reliable power supply with improved regulation.

It is another object of this invention to provide a more stable power supply.

BRIEF SUMMARY OF THE INVENTION

In this switching regulator power supply, a blocking oscillator interacts with a primary winding in the transformer. When the blocking oscillator is on, current builds up in the primary winding, thereby storing energy. When the blocking oscillator is in its turn off period, the current in the primary winding is interrupted and the stored energy is transferred to the other windings. This is known as transformer flyback.

Flyback voltages appear across all the windings in dependence upon the relative number of turns and the degree of coupling between the windings. In the present invention, very tight coupling is attained between selected windings, therefore, close regulation of flyback voltage in a sense winding results in close flyback voltage regulation and hence output voltage regulation in the other windings. The sense winding is not employed as a supply output and therefore there is no coupling circuitry from the secondary side of the transformer to the primary for regulation purposes. An emergency over-voltage sense secondary circuit is provided, but is not used for ordinary regulation.

Due to transformer imperfections, the voltages induced across the windings overshoot the value that they would attain if a perfect transformer could be employed. Since the flyback voltage provides the input to the voltage regulator the overshoot will be regulated instead of the DC flyback voltage. Since flyback overshoot is a function of the load, if the load varies, the voltage regulation will be disrupted. The present invention, however, provides a "clipper" circuit across the primary winding to clip off any overshoot. Thereby, only the DC flyback voltage and not overshoot is regulated.

The present invention is also able to insure greater precision voltage regulation by providing an extremely high gain device in the feedback loop. Therefore, the voltage on a capacitor across the flyback voltage sense winding varies by only a few millivolts instead of by a few volts as in previous power supplies. An additional filtering circuit is provided between the flyback voltage sense winding and the aforementioned capacitor to further eliminate any flyback overshoot remaining.

Power losses in the blocking oscillator transistor are minimized by providing a snubbing circuit across the primary winding to allow the switching transistor sufficient time to completely turn off by slowing the voltage rise on the collector with respect to the emitter at the start of flyback.

BRIEF DESCRIPTION OF THE DRAWINGS

For a more complete understanding of the invention and for further objects and advantages thereof, reference may now be had to the following description taken in conjunction with the accompanying drawing in which.

DETAILED DESCRIPTION OF THE INVENTION

Figure 1A:
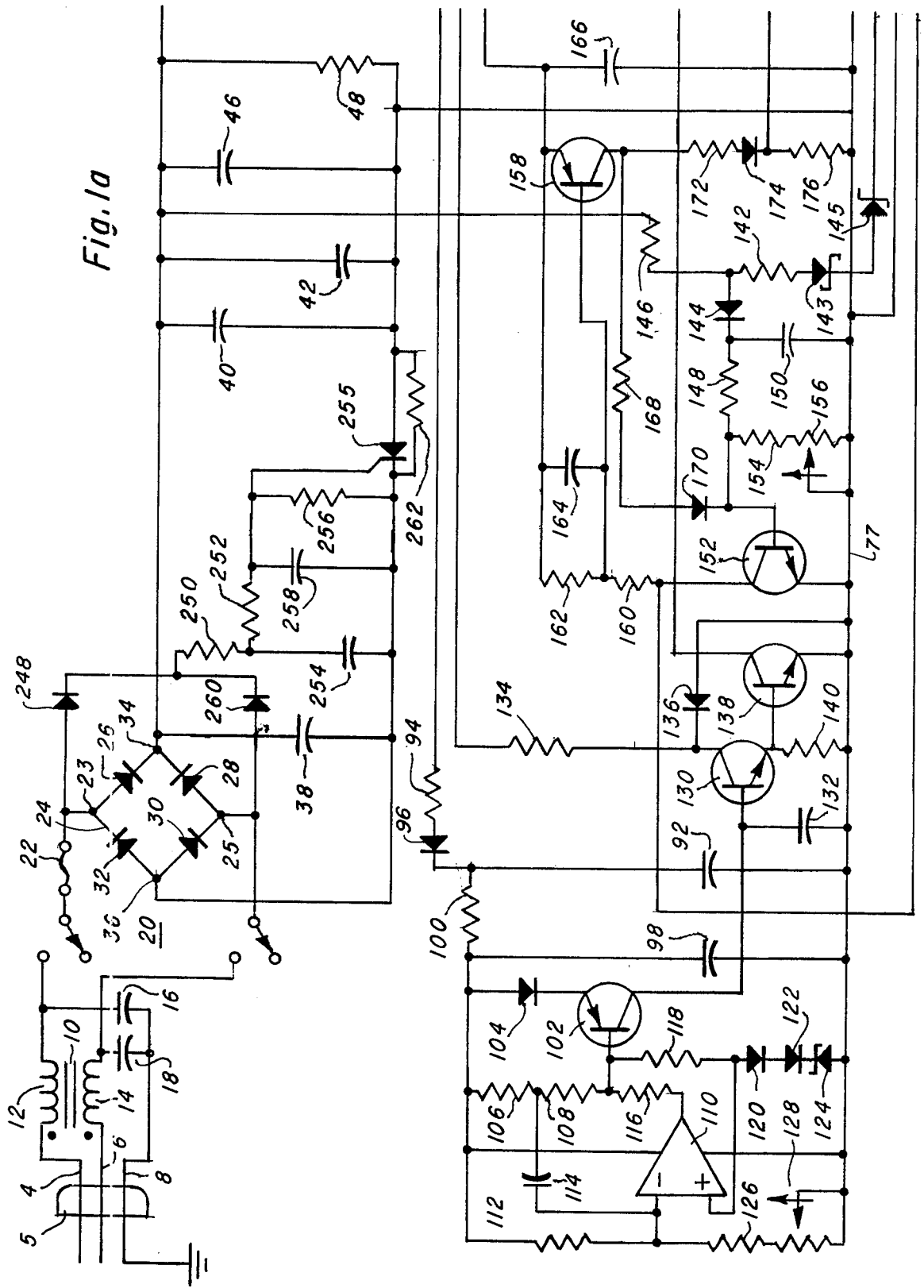
FIG. 1 illustrated as FIG. 1a and FIG. 1b is a schematic diagram of the multiple output self-oscillating switching regulator supply circuit.
Figure 1B:
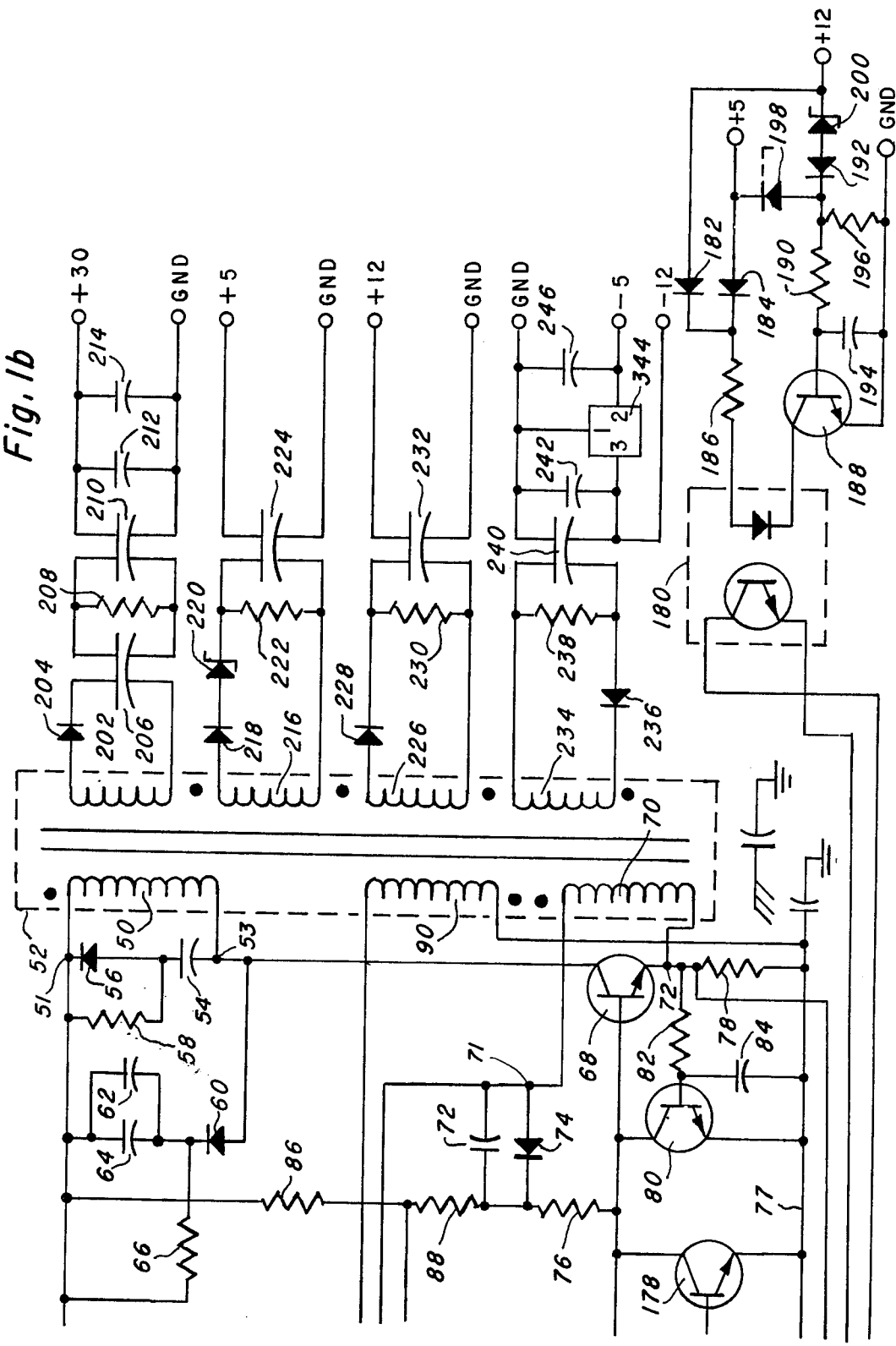

An embodiment of the present invention is herein described which can employ inputs of various frequencies and voltages to produce a set of DC output levels useful for providing power to integrated circuits and terminal printers.

Referring to the FIGURE, an input fixture 5 has a ground terminal 8 and input terminals 4 and 6. Terminal 4 is connected to the left terminal of winding 12 of filter transformer 10 and terminal 6 is connected to the left terminal of winding 14 of transformer 10. The right terminal of winding 12 is connected to ground by way of filter capacitor 16 and the right terminal of coil 14 is also connected to ground through filter capacitor 18. The right terminal of winding 12 is also connected through power switch 20 and fuse 22 to one input terminal 23 of bridge rectifier 24 which is made up of diodes 26, 28, 30 and 32, terminal 23 being located at the junction of the anode of diode 26 and the cathode of diode 32. The right terminal of winding 14 is connected to the other input terminal 25 of bridge rectifier 24 by way of power switch 20 at the junction of the anode of diode 28 and the cathode of diode 30. Output node 34 of bridge rectifier 24 is located at the junction of the cathodes of diodes 26 and 28. The other output node 36 of bridge rectifier 24 is located at the junction of the anodes of diodes 30 and 32, the bridge rectifier 24 thereby providing a positive voltage at output node 34 with respect to output node 36. Output node 34 is connected to one terminal of capacitor 38 whose other terminal is connected to output node 36 and to the junction of the cathode of silicon control rectifier (SCR) 255 and resistor 262. Output node 34 is further connected to a first junction of the parallel combination of filter capacitors 40, 42 and 46, which are in turn connected in parallel with resistor 48, the other junction of this parallel combination being connected to the anode of SCR 255 and the other end of resistor 262. Input terminal 23 of bridge rectifier 24 is connected to the anode of diode 248 whose cathode is connected to the cathode of diode 260. The anode of diode 260 is connected to input terminal 25 of bridge rectifier 24. The junction of the cathodes of diodes 248 and 260 is connected to one end of resistor 250 whose other end is connected through capacitor 254 to node 36 and also through resistor 252 to the parallel combination of capacitor 258 and resistor 256 whose other ends are connected to node 36. The other end of resistor 252 is also connected to the control electrode of SCR 255. The combination of diodes 248 and 260, capacitors 254 and 258, resistors 250, 252, 256 and 262, in combination with SCR 255 make up a soft start circuit which is well known and which is used to limit surge currents during the initial charging of filter capacitors 42 and 46.

The upper terminal of primary winding 50 of transformer 52 is directly connected to output node 34 and is also connected to one end of resistor 58 and the cathode of diode 56, whose anode is connected to the other end of resistor 58 and to the lower terminal of winding 50 through capacitor 54. The combination of capacitor 54, resistor 58 and diode 56 is a "snubber" circuit which forms a simple LC circuit in combination with winding 50. The upper terminal of winding 50 is further connected to a first terminal of each of capacitors 62 and 64 and a first end of resistor 66, the other end of which is connected to the second terminals of capacitors 62 and 64 and to the cathode of diode 60 whose anode is connected to the lower terminal of winding 50. The combination of capacitors 62 and 64, resistor 66 and diode 60 is a clipper circuit for limiting overshoot of flyback voltage.

The collector of power transistor 68 is connected to the lower terminal of winding 50 while its emitter is connected to the lower terminal of base drive winding 70. The upper terminal of winding 70 is connected to the anode of diode 74 and one terminal of capacitor 72 whose other terminal is connected to the cathode of diode 74 and to one end of resistor 76 whose other end is connected to the base of power transistor 68. The connection between resistor 76, the cathode of diode 74, and the other terminal of capacitor 72 is connected through series resistor 88 and through series resistor 86 to node 34.

When the input DC supply voltage appears at node 34, the current set primarily by resistors 86 and 88 flows through resistor 76 into the base of power transistor 68, biasing it on to approximately 50 to 100 milliamps collector current. The lower terminal of winding 70 is also connected to the base of transistor 80 by way of resistor 82 and a common bus 77 by way of resistor 78. The emitter of transistor 80 is connected to common bus 77 and its base is connected by way of capacitor 84 to common bus 77. The combination of transistor 80, capacitor 84 and resistors 78 and 82 is an instantaneous current limiting circuit for limiting the emitter current of transistor 68 to a safe level.

The combination of transformer primary winding 50, base drive winding 70, capacitor 72, diode 74, resistor 76 and power transistor 68, together with the instantaneous over current sensing circuit, is the oscillator circuit. Oscillation begins when the input DC supply voltage appears at node 34. There is a positive feedback path for the transformer primary winding 50 to base drive winding 70. A voltage, positive at terminal 51 of primary winding 50 with respect to terminal 53, is developed across winding 70 due to rising collector current of transistor 68 inducing a voltage positive at terminal 71 with respect to terminal 72 of winding 70. This base drive signal is coupled through capacitor 72, diode 74 and current setting resistor 76 into the base of transistor 68. This causes the collector current to further increase which, due to the feedback path, causes the base current to again increase, thereby assuring saturation of transistor 68. The collector current will therefore increase linearly as determined by the primary inductance of transformer 52 and the input DC supply voltage impressed across it.

When the voltage drop across resistor 78 produced by the emitter current of transistor 68 has risen to approximately 0.6 volts, transistor 80 begins to conduct, shunting base drive from transistor 68 and causing it to come out of saturation. The falling collector current of transistor 68 causes a voltage across winding 50, inducing a reversed voltage across base drive winding 70. This results in falling base drive current to transistor 68 which further reduces collector current. The collector voltage of transistor 68 rapidly rises above the DC supply voltage.

The "snubbing" circuit comprised of capacitor 54, diode 56 and resistor 58, provides an additional path for current out of winding 50. This slows the collector voltage rise at the start of flyback in order to give transistor 68 sufficient time to turn fully off. A "clipper" circuit comprised of diode 60, parallel capacitors 62 and 64 and resistor 66 "clips" off flyback overshoot caused by transformer imperfections.

The secondary winding 202 is connected to the anode of diode 204 whose cathode is connected to a +30 volt output terminal. The four terminal capacitor 206 is connected across winding 202 in parallel with resistor 208, four terminal capacitor 210, and capacitors 212 and 214. The secondary winding 216 is connected to the anode of diode 218 whose cathode is connected to the anode of Schottky diode 220 whose cathode is connected to a +5 volt terminal output. Resistor 222 is connected across winding 216 in parallel with the four terminal capacitor 224. The secondary winding 226 is connected to the anode of diode 228, whose cathode is connected to a positive 12 volt terminal output. Resistor 230 is connected across winding 226 in parallel with four terminal capacitor 232. Secondary winding 234 is connected to the cathode of diode 236, whose anode is connected to a −12 volt output terminal. Resistor 238 is connected across winding 234 in parallel with four terminal capacitor 240 and capacitor 242. The upper terminal of winding 234 is connected to terminal 1 of series pass regulator 244 and capacitor 246. Capacitor 246 is connected to terminal 2 of regulator 244, the −5 output terminal. The anode of diode 236 is also connected to terminal 3 regulator 244.

Flyback voltages induced in transformer secondary windings 202, 216, 226, 234 and sense winding 90 forward bias the rectifier in their associated secondary circuit. The energy stored in the magnetic field of the transformer during the "on" time of transistor 68 is thereby transferred to the output voltage filter capacitors.

A 30 volt output is obtained from winding 202 rectified by diode 204 and filtered by capacitors 206 and 210. Plus and minus 12 volts, respectively, are obtained from windings 226 and 234 rectified by diodes 228 and 236 and filtered by capacitors 232 and 240. Plus 5 volts is obtained from winding 216 rectified by diodes 218 and 220 in series and filtered by capacitor 224. The higher drop of a series connected diodes 218 and 220 allows 5 and 12 volts respectively to be obtained from input flyback voltages having a 2 to 1 ratio of about 6.35 volts and 12.7 volts.

Secondary currents continue to flow decreasing approximately linearly with time until the transformer flux has fallen to essentially zero. The transformer winding voltages remain at their flyback values during the entire period of the secondary current flow. During a single flyback period, the output voltages rise only a few percent of their full value as determined by the values of the output capacitors. Then, as the flyback currents fall to zero, the voltages across the transformer windings decay toward zero.

During the flyback interval, capacitor 72 acquires a charge of about a volt, left-hand side positive, due to the current from resistor 76. Resistor 76 is clamped by transistor 80 which acts as an emitter follower in the inverted mode when its collector goes over a diode drop below the primary side DC ground at common bus 77. Note that the current coming from start up resistors 86 and 88 is much smaller than the current in resistor 76 and has a negligible effect once oscillation has begun. Thus, as the voltage across the base drive winding 70 falls toward zero, the positive voltage across capacitor 72 raises the base of transistor 68 to the threshold of conduction through resistor 76, initiating a regenerative power transistor turn-on cycle.

The upper terminal of sense winding 90 of transformer 52 is connected by way of resistor 94 to the anode of diode 96 whose cathode is connected to one terminal of capacitor 92. That terminal of capacitor 92 is connected to one terminal of capacitor 98 by way of resistor 100. The other terminal of capacitor 92 and 98 are connected to bus line 77. Resistor 100 is connected to the anode of diode 104 whose cathode is connected to the emitter of transistor 102. Resistor 100 is also connected to the base of transistor 102 by way of resistors 106 and 108 and also to the negative input of operational amplifier (op amp) 110 by way of resistor 112. Resistor 106 is connected to the negative input of op amp 110 by way of capacitor 114. The base of transistor 102 is connected to the output of op amp 110 by way of resistor 116 and to the positive input of op amp 110 by way of resistor 118. The junction of resistor 118 and the positive input of op amp 110 is connected to the anode of diode 120 whose cathode is connected to the anode of diode 122 whose cathode is connected to the cathode of Zener diode 124 whose anode is connected to bus line 77. The negative input of op amp 110 is connected by way of resistor 126 and potentiometer 128 to common bus line 77. The collector of transistor 102 is connected to the base of transistor 130 and is also connected to common bus line 77 by way of capacitor 132. Transistor 130 and capacitor 132 make up a timing circuit. The collector of transistor 130 is connected to the upper terminal of winding 70 of transformer 52 by way of resistor 134 and is also connected to the cathode of diode 136 whose anode is connected to common bus line 77. The emitter of transistor 130 is connected to the base of current sink transistor 138 and to common bus line 77 by way of resistor 140. The collector of transistor 138 is connected to the base of transistor 68. The emitter of transistor 138 is connected to common bus line 77.

Transistors 102, 130 and 138 with op amp 110 and associated resistors, diodes and regulator sense winding 90 form the voltage regulator portion of the supply. Until the output voltages have reached their correct values, the collector current of switching transistor 68 ramps up to its current limit value each cycle as set by transitor 80. As a result, the maximum safe amount of energy is transferred to the output filter capacitors and output loads as determined by the transformer core saturation limitation. During each flyback cycle, the capacitor 98 is charged through diode 96 and series resistors 94 and 100 in the same way as the output capacitors.

Resistor 94 with capacitor 92 and further resistor 100 with the main regulator filter capacitor 98 serve as high frequency noise and flyback overshoot filters so that capacitor 98 is charged to the average value less a diode drop of flyback voltage appearing across sense winding 90 during each cycle. As soon as voltage is developed across capacitor 98, the negative input of op amp 110, because of the voltage divider formed by resistors 112 and 126, and potentiometer 128, becomes negative with respect to its positive input, which is held at the full output voltage of capacitor 98 through resistors 118, 108 and 106 since Zener diode 124 passes essentially zero current until its breakdown voltage is approached. This assures that op amp 110 will remain in positive saturation and therefore that transistor 102 will be off. As the power supply voltages rise towards their correct values and the voltage across capacitor 98 increases proportionally, the voltage at the positive input of op amp 110 is clamped as Zener diode 124 begins conducting. Voltage then appears across resistors 106 and 108 due to current in resistor 118 which initiates output voltage regulation as the voltage on the negative input of op amp 110 approaches that of positive input due to current through resistor 116. As the base voltage of transistor 68 102 falls below the voltage of capacitor 98 by two diode drops, transistor 102 begins to conduct, acting as a controlled current source, the output current of which flows into timing capacitor 132.

However, during flyback, the base drive winding 70 which also drives resistor 134 is negative which turns on diode 136 and thereby clamps the timing capacitor to ground through the base-collector diode of transistor 130, sinking the output of the current source transistor 102 during the flyback period. When power transistor 68 switches on after flyback, resistor 134 is taken positive by base drive winding 70, thus causing transistor 130 to operate as an emitter follower buffering the timing capacitor 132. The voltage across capacitor 132 then begins to ramp up at a rate proportional to the current from transistor 102. When increasing voltage across capacitor 132 reaches approximately 2 diode drops, the output buffer transistor 130 begins to rapidly turn on transistor 138 which sinks base current from transistor 68 and causes its regenerative turn off just as current limiter transistor 80 does. The action of the regulator loop thus controls the power transistor "on" time and thereby the peak current flowing in the transformer primary. The voltage across capacitor 98 is held constant to within a millivolt by op amp 110 operating at its full DC open loop gain to maintain zero differential input voltage. Constant voltage across capacitor 98 implies that the feedback voltage feeding diode 96 remains constant and since all windings are very tightly coupled, that the flyback output voltage from all windings remain constant neglecting IR drops. Therefore, there is very little cross coupling to the output voltage of any winding from changing loads on any other winding and very little effect from changing primary side DC input voltage. The only significant output voltage deviations well within tolerances are the changes in an output voltage due to its own load change and resulting from rectifier diode drop changes and winding IR drops. High frequency ripple and noise components are minimized by the use of four terminal capacitors such as capacitor 210.

Node 34 of bridge rectifier 24 is connected to resistor 142 and the anode of diode 144 by means of resistor 146. The cathode of diode 144 is connected to resistor 148 and is also connected to common bus 77 by means of capacitor 150. Resistor 148 is connected to the base of transistor 152 and also connected to common bus 77 by way of resistor 154 and potentiometer 156. The collector of transistor 152 is connected to the base of transistor 158 by means of resistor 160. The base of transistor 158 is connected to its emitter by way of resistor 162 and capacitor 164. The emitter of transistor 158 is also connected to one end of capacitor 166 and the junction of resistors 86 and 88. The other end of capacitor 166 is connected to bus line 77. The collector of transistor 158 is connected to the anode of diode 170 by way of resistor 168 and is also connected to the anode of diode 174 by way of resistor 172. The cathode of diode 174 is connected to bus line 77 by way of resistor 176. The cathode of diode 170 is connected to the base of transistor 152. The cathode of diode 174 is connected to the base of transistor 178. The emitter of transistor 178 is connected to common bus line 77 and its collector is connected to the base of transistor 68. Resistor 142 is connected to the anode of Schottky diode 143 whose cathode is connected to the anode of Schottky 145 whose cathode is connected to the junction of resistor 78 and transistor 68. The collector of transistor 152 is connected to the collector of optical coupler 180. The emitter of optical coupler 180 is connected to common bus 77. The anode of optical coupler 180 is connected to the cathodes of diodes 182 and 184 by way of resistor 186. The cathode of optical coupler 180 is connected to the collector of transistor 188. The base of transistor 188 is connected by way of resistor 190 to the cathode of diode 192. The emitter of transistor 188 is connected to the base of transistor 188 by way of capacitor 194 and is also connected to the cathode of diode 192 by way of resistor 196. Resistor 190 is connected to the anode of diode 198 whose cathode is connected to the anode of diode 184. The anode of diode 192 is connected to the anode of Zener diode 200 whose cathode is connected to the anode of diode 182.

Transistors 152 and 158 and associated components form a latch which positively turns off the switching transitor 68 in the event of sustained over current or output over voltage. Transistors 152 and 158 cross-couple such that when transistor 152 is turned on, transistor 158 is also turned on and both will remain on as long as primary side DC is present. The over current is sensed by peak rectifier 144 and filter capacitor 150. Output over voltage is sensed by transistor 188 and associated components and transmitted to transistor 152 by optical coupler 180. When the latch triggers, it turns on transistor 178 by providing a large base current by the discharge of capacitor 166 principally through resistor 172 and and diode 174. This action assures that transistor 178 will immediately turn off transistor 68 and hold the base of transistor 68 below the threshold of conduction as long as primary side DC is present.

Very tight coupling among sense winding 90, plus 5 volt winding 216, plus 12 volt winding 226, minus 12 volt winding 234 and to a lesser extent primary winding 50, plus 30 volt winding 202, and base drive winding 70 is achieved by the following transformer winding scheme.

The first layer is comprised of winding 50 and winding 202 which are bifilar wound for 20 turns. That is, the wires are twisted together before winding. Since winding 202 has only ten turns, another wire is twisted with winding 50 for the remaining 10 turns then connected in parallel with the first wire of winding 202. The second layer is comprised of winding 90, 216, 226 and 234 which are quadrafilar wound for four turns. Since winding 216 is to have only two turns winding 216 consists of two separate wires connected in parallel as was done with winding 202. Layer 3 is comprised of winding 50 and winding 202 for the remaining twenty turns of winding 50, giving a total of 40 turns. Since winding 202 is to have a total of only ten turns, this layer is constructed as the first layer and all four wires of winding 202 (from the first and third layer) are connected in parallel. The last layer is winding 70 which has two turns.

Having described the invention in connection with certain specific embodiments thereof, it is to be understood that further modification may now suggest themselves to those skilled in the art and that it is intended to cover such modifications as fall within the scope of the appended claims.

What is claimed is:

1. A regulated power supply circuit having an energy storage cycle and an energy transfer cycle comprising:
   (a) DC voltage input means for receiving an input voltage;
   (b) power switching means connected to the input means to close and provide power during the energy storage cycle and to open during the energy transfer cycle;
   (c) a transformer having a primary winding connected to the input means through the power switching means to permit current flow during the energy storage cycle, at least one secondary winding, biased to permit current flow only during the energy transfer cycle, a base drive winding to drive the power switching means, and a sense winding; and
   (d) feedback means operatively connected to the sense winding which includes a current sinking means for opening the power switching means, timing means for turning on the current sinking means after a predetermined delay, a reference capacitor operatively connected with the sense winding, a high gain voltage comparison means connected with the reference capacitor and the timing means for controlling the timing means whereby the current sinking means is turned on in dependence on the voltage variation on said capacitor.

2. The combination set forth in claim 1 wherein said power switching means comprises a transistor.

3. The combination set forth in claim 2 wherein said current sinking means comprises a transistor having its collector connected to the base of the power transistor.

4. The combination set forth in claim 1 wherein said timing means comprises a controlled current source and a timing capacitor adapted to accept the output of the current source and operatively connected to the current sinking means.

5. The combination set forth in claim 4 wherein said controlled current source comprises a transistor whose collector is connected to the timing capacitor and to the current sinking means.

6. The combination set forth in claim 1 wherein said high gain voltage comparison means comprises:
   (i) an operational amplifier having an output connected with the timing means and having at least two inputs, and
   (ii) a voltage reference connected with one of the inputs and the other input connected with the reference capacitor.

7. The combination set forth in claim 1 further comprising a latch including
   (a) a first latch transistor,
   (b) a second latch transistor whose base and collector are connected to the collector and base, respectively, of first transistor, whereby both transistors are turned on when either is turned on, and
   (c) a shut-off transistor connected to the output of said second latch transistor and connected to turn off said switching means when turned on by the first and second latch transistors being turned on.

8. The combination set forth in claim 7 further comprising an over voltage sense including:
   (a) a Zener diode whose cathode is one circuit input;
   (b) a second diode whose cathode is another circuit input;
   (c) an output signal transistor having its base connected to the anodes of said Zener diode and second diode, respectively, to cause the output signal transistor to turn on when either or both of the Zener diode and the second diode conduct;
   (d) an optical coupler operatively connected to said first latch transistor whereby said over voltage sense may cause the turn off of said power switching means by causing the latch to turn on.

9. The combination set forth in claim 8 further comprising an over current sense including:
   (a) a filter capacitor, connected between the base and emitter of the first latch transistor;
   (b) a diode whose anode is connected to the power switching means and whose cathode is connected to the base of said first latch transistor whereby said over current sense may cause the turn off of said power switching means by causing the latch to turn on.

10. The combination set forth in claim 1 wherein a corresponding plurality of secondary windings and a plurality of rectifier-capacitor combinations provide a plurality of voltages for power supply output and for voltage regulation input.

11. The combination set forth in claim 10 wherein said plurality of secondary windings are tightly coupled whereby close voltage regulation on one winding results in close voltage regulation on the other windings.

* * * * *

Disclaimer and Dedication

4,092,709.—*William G. Voigt* and *William F. Jergens*, Houston, Tex. MULTIPLE OUTPUT SELF OSCILLATING CONVERTER REGULATOR POWER SUPPLY. Patent dated May 30, 1978. Disclaimer and Dedication filed Jan. 26, 1984, by the assignee, *Texas Instruments, Inc.*

Hereby disclaims and dedicates to the Public claims 1-11 of said patent.
[*Official Gazette May 15, 1984.*]